United States Patent

Fishback et al.

[11] Patent Number: 5,468,420
[45] Date of Patent: Nov. 21, 1995

[54] POLYOL COMPOSITIONS AND RIGID POLYISOCYANATE BASED FOAMS CONTAINING 2-CHLOROPROPANE AND ALIPHATIC HYDROCARBON BLOWING AGENTS

[75] Inventors: Thomas L. Fishback, Gibraltar; Thomas B. Lee, Southgate, both of Mich.

[73] Assignee: BASF Corporation, Mt. Olive, N.J.

[21] Appl. No.: 446,992

[22] Filed: May 22, 1995

Related U.S. Application Data

[62] Division of Ser. No. 291,631, Aug. 17, 1994.

[51] Int. Cl.⁶ .................................................. C08K 3/00
[52] U.S. Cl. ................... 252/182.24; 252/182.27; 521/131; 521/174
[58] Field of Search ................... 521/131, 174; 252/182.24, 182.27

[56] References Cited

U.S. PATENT DOCUMENTS

| | | |
|---|---|---|
| 4,898,893 | 2/1990 | Ashida . |
| 5,064,872 | 11/1991 | Monstrey et al. . |
| 5,096,933 | 3/1992 | Volkert . |
| 5,132,332 | 7/1992 | Wallaeys et al. . |

*Primary Examiner*—Morton Foelak
*Attorney, Agent, or Firm*—Dennis V. Carmen

[57] ABSTRACT

There is provided a polyol composition which comprises a a) compound having at least two isocyanate reactive hydrogens, at least one of which is a polyoxyalkylene polyether polyol, b) 2-chloropropane, and, c) a $C_4$–$C_6$ aliphatic hydrocarbon.

There is also provided a rigid polyurethane foam made with the polyol composition. The 2-chloropropane acts to solubilize the $C_4$–$C_6$ aliphatic hydrocarbon in the polyols.

10 Claims, No Drawings

POLYOL COMPOSITIONS AND RIGID POLYISOCYANATE BASED FOAMS CONTAINING 2-CHLOROPROPANE AND ALIPHATIC HYDROCARBON BLOWING AGENTS

This is a division, of application Ser. No. 08/291,631 filed Aug. 17, 1994.

1. Field of the Invention

The invention relates to polyol compositions and rigid polyisocyanate based foams. In particular, the polyol composition and rigid polyurethane foams made therewith are made with a combination of a polyoxyalkylene polyether polyol, 2-chloropropane and a $C_4$–$C_6$ aliphatic hydrocarbon blowing agent.

2. Background of the Invention

The polyurethane foam industry is well under way replacing the ozone depleting chlorofluorocarbons (CFCs) with more benign compounds such as hydrochlorofluorocarbons (HCFCs). However, HCFCs appear to be a temporary replacement; and efforts continue toward a permanent solution by employing blowing agents that have zero ozone depletion potential.

Hydrocarbons are a class of compounds receiving considerable attention as possible permanent solutions to HCFC-blown foams. Advantages of hydrocarbons include a zero ozone depletion potential, a very low global warming potential, and being liquids at room temperature. Hydrocarbons are also inexpensive when compared to HCFCs or hydrofluoroalkanes (HFAs). In addition, the technology for the safe handling of flammable blowing agents in a manufacturing environment already exists in practice. One drawback to hydrocarbons, however, is that they are insoluble in polyols and do not form stable homogenous mixtures. This not only leads to processing complications but also a non-uniform cell density in the foam product. As a result, hydrocarbons must be separately added and vigorously mixed with polyols immediately prior to the manufacture of the rigid foam or injected as a separate stream into a mix head. If one desires to avoid separate addition and mixing the polyols and hydrocarbon immediately prior to foam manufacture, the only other solution currently is to create an emulsion using emulsifiers.

3. Summary of the Invention

It is an object of the invention to make a polyol composition where a $C_4$–$C_6$ aliphatic hydrocarbon is homogeneously miscible with polyols used in the manufacture of rigid polyisocyanate based foams. This object is made possible by adding 2-chloropropane to the polyol composition. A polyol composition containing a $C_4$–$C_6$ aliphatic hydrocarbon dissolved in polyols by 2-chloropropane can be pre-manufactured and formulated as a package suitable for transport to a manufacturer of rigid polyisocyanate based foams.

4. Detailed Description of the Invention

The polyol composition of the invention comprises a a) compound having at least two isocyanate reactive hydrogens, at least one of which is a polyoxyalkylene polyether polyol, b) 2-chloropropane, and, c) a $C_4$–$C_6$ aliphatic hydrocarbon, optionally along with catalysts, chain extenders, additive flame retardants, surfactants, and fillers. The polyol composition is reacted with an organic isocyanate in the presence of blowing agents.

The compounds with at least two isocyanate reactive hydrogens have a functionality of 1.8 to 8, more preferably 3 to 8, and an average hydroxyl number of 150 to 850, more preferably 350 to 800, and a number average molecular weight of greater than 400. Polyols having hydroxyl numbers outside this range may be used, but it is preferred that the average hydroxyl number for the total amount of polyols used fall within the range of 150 to 850.

Examples include at least a polyoxyalkylene polyether polyol, and optionally polythioether polyols, polyester amides and polyacetals containing hydroxyl groups, aliphatic polycarbonates containing hydroxyl groups, amine terminated polyoxyalkylene polyethers, or polyester polyols. In addition, mixtures of at least two of the aforesaid polyols can be used.

Polyoxyalkylene polyether polyols, which is meant to include within its scope the polymer modified polyols, are at least one of the compounds used as the compounds having at least two isocyanate active hydrogens. To prepare the convention polyether polyols, any suitable alkylene oxide may be used such as 1,3-propylene oxide, 1,2- and 2,3-butylene oxide, amylene oxides, styrene oxide, and preferably ethylene oxide and 1,2-propylene oxide and mixtures of these oxides. The polyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyalkylene polyether polyols may have either primary or secondary hydroxyl groups.

Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-tetramethylene and polyoxyethylene glycols, and copolymer glycols prepared from blends or sequential addition of two or more alkylene oxides. The polyalkylene polyether polyols may be prepared by any known process such as, for example, the process disclosed by Wurtz in 1859 and *Encyclopedia of Chemical Technology*, Vol. 7, pp. 257–262, published by Interscience Publishers, Inc. (1951) or in U.S. Pat. No. 1,922,459.

Polyethers include the alkylene oxide addition products of polyhydric alcohols such as ethylene glycol, propylene glycol, dipropylene glycol, trimethylene glycol, 1,2-butanediol, 1,5-pentanediol, 1,6-hexanediol, 1,7-heptanediol, hydroquinone, resorcinol glycerol, glycerine, 1,1,1-trimethylolpropane, 1,1,1-trimethylolethane, pentaerythritol, 1,2,6-hexanetriol, α-methyl glucoside, sucrose, and sorbitol. Also included within the term "polyhydric alcohol" are compounds derived from phenol such as 2,2-bis(4-hydroxyphenyl)-propane, commonly known as Bisphenol A.

Suitable organic amine initiators which may be condensed with alkylene oxides include aromatic amines such as aniline, N-alkylphenylene-diamines, 2,4'-, 2,2'-, and 4,4'-methylenedianiline, 2,6- or 2,4-toluenediamine, vicinal toluenediamines, o-chloro-aniline, p-aminoaniline, 1,5-diaminonaphthalene, methylene dianiline, the various condensation products of aniline and formaldehyde, and the isomeric diaminotoluenes; and aliphatic amines such as mono-, di-, and trialkanolamines, ethylene diamine, propylene diamine, diethylenetriamine, methylamine, triisopropanolamine, 1,3-diaminopropane, 1,3-diaminobutane, and 1,4-diaminobutane. Preferable amines include monoethanolamine, vicinal toluenediamines, ethylenediamines, and propylenediamine.

Also suitable as the "polyoxyalkylene polyether polyol" as meant herein are polymer modified polyols, in particular, the so-called graft polyols. Graft polyols are well known to the art and are prepared by the in situ polymerization of one or more vinyl monomers, preferably acrylonitrile and styrene, in the presence of a polyether or polyester polyol, particularly polyols containing a minor amount of natural or induced unsaturation. Methods of preparing such graft polyols may be found in columns 1–5 and in the Examples of U.S. Pat. No. 3,652,639; in columns 1–6 and the Examples of U.S. Pat. No. 3,823,201; particularly in columns 2–8 and the Examples of U.S. Pat. No. 4,690,956; and in U.S. Pat. No. 4,524,157; all of which patents are herein incorporated by reference.

Non-graft polymer modified polyols are also preferred, for example, those prepared by the reaction of a polyisocyanate with an alkanolamine in the presence of a polyol as taught by U.S. Pat. Nos. 4,293,470; 4,296,213; and 4,374,209; dispersions of polyisocyanurates containing pendant urea groups as taught by U.S. Pat. 4,386,167; and polyisocyanurate dispersions also containing biuret linkages as taught by U.S. Pat. 4,359,541. Other polymer modified polyols may be prepared by the in situ size reduction of polymers until the particle size is less than 20 μm, preferably less than 10 μm.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing at least two -SH groups such as 1,2-ethanedithiol, 1,2-propanedithiol, 1,2-propanedithiol, and 1,6-hexanedithiol; alkene thiols such as 2-butene-1,4-dithiol; and alkyne thiols such as 3-hexyne-1,6-dithiol.

The ingredient 2-chloropropane is most effective at solubilizing polyoxyalkylene polyether polyols. We have discovered that 2-chloropropane only partially homogeneously solubilizes $C_4$–$C_6$ aliphatic hydrocarbons in polyester polyols. Some commercially available polyester polyols contain additives such as nonyl phenols which render the $C_4$–$C_6$ aliphatic hydrocarbons more soluble in the presence of 2-chloropropane. Nevertheless, optimum miscibility is obtained in the presence of polyoxyalkylene polyether polyols. For this reason, the a) compounds preferably contain greater than 50 weight percent of polyoxyalkylene polyether polyols. It is more preferred that the compounds having at least two isocyanate reactive hydrogens consist essentially of polyoxyalkylene polyether polyols, meaning that 20 weight percent or less of the polyols are other than polyoxyalkylene polyether polyols such as polyester polyols, and most preferably, 100 weight percent of the compounds are polyoxyalkylene polyether polyols.

The second essential ingredient in the combination is 2-chloropropane, which not only acts to solubilize the $C_4$–$C_6$ aliphatic hydrocarbon, but is also a coblowing agent. Thus, the amount of $C_4$–$C_6$ aliphatic hydrocarbon blowing agent used, along with any additional optional co-blowing agents used, may be reduced by the molar equivalent produced by the blowing action of 2-chloropropane. The amount of 2-chloropropane used in the polyol composition is effective to homogeneously solubilize the $C_4$–$C_6$ aliphatic hydrocarbon in the a) compounds. The particular amount will vary depending upon the amount of $C_4$–$C_6$ aliphatic hydrocarbon used and the type and amounts of polyoxyalkylene polyether polyols used. It is preferred, however, to use the minimum amount of 2-chloropropane necessary to render the $C_4$–$C_6$ aliphatic hydrocarbon homogeneously miscible in the particular polyol composition used to make the rigid foam. Suitable amounts of 2-chloropropane will generally range from 2 pbw to 10 pbw, more preferably from 6 pbw to 8 pbw, based on 100 pbw of the total amount of polyoxyalkylene polyether polyols used.

Examples of the c) aliphatic $C_4$–$C_6$ hydrocarbons include linear or branched alkanes, e.g. butane, isobutane, 2,3 dimethylbutane, n- and isopentane and technical-grade pentane mixtures, and n- and isohexanes. Preferred are n-pentane, isopentane or n-hexane, or a mixture thereof. Furthermore, specific examples of alkenes are 1-pentene, 2-methylbutene, 3-methylbutene, and 1-hexene; and of cycloalkanes are cyclobutane, preferably cyclopentane, cyclohexane or mixtures thereof. Preferentially, cyclopentane, n- and isopentane, n-hexane, and mixtures thereof are employed.

The blowing agents which can be used in addition to the mono-halogenated hydrocarbon may be divided into the chemically active blowing agents which chemically react with the isocyanate or with other formulation ingredients to release a gas for foaming, and the physically active blowing agents which are gaseous at the exotherm foaming temperatures or less without the necessity for chemically reacting with the foam ingredients to provide a blowing gas. Included with the meaning of physically active blowing agents are those gases which are thermally unstable and decompose at elevated temperatures.

Examples of chemically active blowing agents are preferentially those which react with the isocyanate to liberate gas, such as $CO_2$. Suitable chemically active blowing agents include, but are not limited to, water, mono- and polycarboxylic acids having a molecular weight of from 46 to 300, salts of these acids, and tertiary alcohols.

Water is preferentially used as a co-blowing agent. Water reacts with the organic isocyanate to liberate $CO_2$ gas which is the actual blowing agent. However, since water consumes isocyanate groups, an equivalent molar excess of isocyanate must be used to make up for the consumed isocyanates.

The organic carboxylic acids used are advantageously aliphatic mon- and polycarboxylic acids, e.g. dicarboxylic acids. However, other organic mono- and polycarboxylic acids are also suitable. The organic carboxylic acids may, if desired, also contain substituents which are inert under the reaction conditions of the polyisocyanate polyaddition or are reactive with isocyanate, and/or may contain olefinically unsaturated groups. Specific examples of chemically inert substituents are halogen atoms, such as fluorine and/or chlorine, and alkyl, e.g. methyl or ethyl. The substituted organic carboxylic acids expediently contain at least one further group which is reactive toward isocyanates, e.g. a mercapto group, a primary and/or secondary amino group, or preferably a primary and/or secondary hydroxyl group.

Suitable carboxylic acids are thus substituted or unsubstituted monocarboxylic acids, e.g. formic acid, acetic acid, propionic acid, 2-chloropropionic acid, 3-chloropropionic acid, 2,2-dichlorpropionic acid, hexanoic acid, 2-ethyl-hexanoic acid, cyclohexanecarboxylic acid, dodecanoic acid, palmitic acid, stearic acid, oleic acid, 3-mercapto-propionic acid, glycol acid, 3-hydroxypropionic acid, lactic acid, ricinoleic acid, 2-aminopropionic acid, benzoic acid, 4-methylbenzoic acid, salicylic acid and anthranilic acid, and unsubstituted or substituted polycarboxylic acids, preferably dicarboxylic acids, e.g. oxalic acid, malonic acid, succinic acid, fumaric acid, maleic acid, glutaric acid, adipic acid, sebacic acid, dodecanedioic acid, tartaric acid, phthalic acid, isophthalic acid and citric acid. Preferable acids are formic acid, propionic acid, acetic acid, and 2-ethylhexanoic acid, particularly formic acid.

The amine salts are usually formed using tertiary amines, e.g. triethylamine, dimethylbenzylamine, diethylbenzylamine, triethylenediamine, or hydrazine. Tertiary amine salts of formic acid may be employed as chemically active blowing agents which will react with the organic isocyanate. The salts may be added as such or formed in situ by reaction between any tertiary amine (catalyst or polyol) and formic acid contained in the polyol composition.

Combinations of any of the aforementioned chemically active blowing agents may be employed, such as formic acid, salts of formic acid, and/or water.

Physically active blowing agents are those which boil at the exotherm foaming temperature or less, preferably at 50° C. or less. The most preferred physically active blowing agents are those which have an ozone depletion potential of 0.05 or less. Examples of physically active blowing agents besides the $C_4$–$C_6$ aliphatic hydrocarbons mentioned above are hydrochlorofluorocarbons (HCFCs); hydrofluorocarbons (HFCs); perfluorinated hydrocarbons (HFCs); fluorinated ethers (HFCs); and decomposition products.

Any hydrochlorofluorocarbon blowing agent may be used in the present invention. Preferred hydrochlorofluorocarbon blowing agents include 1-chloro-1,2-difluoroethane; 1-chloro- 2,2-difluoroethane (142a); 1-chloro-1,1-difluoroethane (142b); 1,1-dichloro-1-fluoroethane (141b); 1-chloro-1,1,2-trifluoroethane; 1-chloro-1,2,2-trifluoroethane; 1,1-dichloro- 1,2-difluoroethane; 1-chloro-1,1,2,2-tetrafluoroethane (124a); 1-chloro-1,2,2,2-tetrafluoroethane (124); 1,1-dichloro- 1,2,2-trifluoroethane; 1,1-dichloro-2,2,2-trifluoroethane (123); and 1,2-dichloro-1,1,2-trifluoroethane (123a); monochlorodifluoromethane (HCFC- 22); 1-chloro-2,2,2-trifluoroethane (HCFC-133a); gem-chlorofluoroethylene (R-1131a); chloroheptafluoropropane (HCFC-217); chlorodifluoroethylene (HCFC-1122); and transchlorofluoroethylene (HCFC-1131). The most preferred hydrochlorofluorocarbon blowing agent is 1,1-dichloro-1-fluoroethane (HCFC-141b).

Suitable hydrofluorocarbons, perfluorinated hydrocarbons, and fluorinated ethers include difluoromethane (HFC-32); 1,1,1,2-tetrafluoroethane (HFC-134a); 1,1,2,2-tetrafluoroethane(HFC- 134); 1,1-difluoroethane(HFC-152a); 1,2-difluoroethane(HFC-142), trifluoromethane; heptafluoropropane; 1,1,1-trifluoroethane; 1,1,2-trifluoroethane; 1,1,1,2,2-pentafluoropropane; 1,1,1,3-tetrafluoropropane; 1,1,2,3,3-pentafluoropropane; 1,1,1,3,3-pentafluoro-n-butane; hexafluorocyclopropane (C-216); octafluorocyclobutane (C-318); perfluorotetrahydrofuran; perfluoroalkyl tetrahydrofurans; perfluorofuran; perfluoro-propane, -butane, -cyclobutane, -pentane, -cyclopentane, and -hexane, -cyclohexane,-heptane, and -octane; perfluorodiethyl ether; perfluorodipropyl ether; and perfluoroethyl propyl ether.

Decomposition type physically active blowing agents which release a gas through thermal decomposition include pecan flour, amine/carbon dioxide complexes, and alkyl alkanoate compounds, especially methyl and ethyl formates.

Polyisocyanate based foam densities typical for many applications range from free rise densities of 0.5 to 10 pcf, preferably from 1.2 to 3.5 pcf. The amount by weight of all blowing agents is generally, based on 100 pbw of the a) compounds, from 0.05 to 45 pbw. The $C_4$–$C_6$ aliphatic hydrocarbon is preferably the chief density controlling agent, meaning that greater than 50 mole percent of the gases produced for blowing are $C_4$–$C_6$ aliphatic hydrocarbons. In general the amount of c) hydrocarbon is from 10 to 35 pbw based on 100 pbw of the a) compounds, more preferably from 20 pbw to 30 pbw.

Water is typically found in minor quantities in the polyols as a byproduct and may be sufficient to provide the desired blowing from a chemically active substance. Preferably, however, water is additionally introduced into the polyol composition in amounts from 0.05 to 5 pbw, preferably from 0.25 to 3 pbw, based on 100 pbw of the a) compounds. The physically active blowing agents, if employed, make up the remainder of the blowing agent for a total of from 0.05 to 45 pbw.

Besides the polyols in the polyol composition, and the blowing agents, there may also be included crosslinkers/ chain extenders, surfactants, non-reactive (additive) organophosphorus flame retardants and other types of flame retardants, catalysts, dyes and pigments, fillers, anti-hydrolysis agents, and fungistatic and bacteriostatic agents.

Chain-extending agents which have no polyether or polyester groups may optionally be employed in the preparation of the polyurethane foams include those compounds having at least two functional groups bearing active hydrogen atoms and with number average molecular weights of less than 400, more preferably 46 to 300, such as water, hydrazine, primary and secondary diamines, amino alcohols, amino acids, hydroxy acids, glycols, or mixtures thereof. The weight of the chain extending agents are included as a part of the "polyols" for the purpose of calculating parts by weight of a compound based on 100 pbw of the polyols. A preferred group of chain-extending agents includes water, ethylene glycol, 1,3-propanediol, 1,10-decanediol, o,-m,-p-dihydroxycyclohexane, diethylene glycol, 1,6-hexanediol, glycerine, trimethylol propane, 1,2,4-, 1,3,5-trihydroxycyclohexane, bis(2-hydroxyethyl) hydroquinone, 1,4-butanediol and primary and secondary diamines which react more readily with a prepolymer than does water such as phenylene diamine, 1,4-cyclohexane-bis-(methylamine), ethylenediamine, diethylenetriamine, N-(2-hydroxypropyl)ethylenediamine, N,N'-di(2-hydroxypropyl)ethylenediamine, piperazine, and 2-methylpiperazine.

Examples of suitable surfactants are compounds which serve to support homogenization of the starting materials and may also regulate the cell structure of the plastics. Specific examples are salts of sulfonic acids, e.g., alkali metal salts or ammonium salts of fatty acids such as oleic or stearic acid, of dodecylbenzene- or dinaphthylmethanedisulfonic acid, and ricinoleic acid; foam stabilizers, such as siloxaneoxyalkylene copolymers and other organopolysiloxanes, oxyethylated alkyl-phenols, oxyethylated fatty alcohols, paraffin oils, castor oil esters, ricinoleic acid esters, Turkey red oil and groundnut oil, and cell regulators, such as paraffins, fatty alcohols, and dimethylpolysiloxanes. The surfactants are usually used in amounts of 0.01 to 5 parts by weight, based on 100 parts by weight of the a) compounds.

Catalysts may be employed which greatly accelerate the reaction of the compounds containing hydroxyl groups and with the modified or unmodified polyisocyanates. Examples of suitable compounds are organometallic compounds, preferably organotin compounds, such as tin(II) salts of organic carboxylic acids, for example, tin(II) acetate, tin(II) octanoate, tin(II) ethylhexanoate and tin(II) laurate, and the dialkyltin(IV) salts of organic carboxylic acids, for example, dibutyltin diacetate, dibutyltin dilaurate, dibutyltin maleate and dioctyltin diacetate, and tertiary amines, for example, triethylamine, triethylenediamine, tributylamine, dimethylbenzylamine, N-methyl-, N-ethyl- and N-cyclohexylmorpholine, N,N,N',N'-tetramethylethylenediamine, N,N,N',N'-tetramethylbutanediamine or -hexanediamine, N,N,N'-trimethyl isopropyl propylenediamine, pentamethyldiethylenetriamine, tetramethyldiaminoethyl ether, bis(dimethylaminopropyl)urea, dimethylpiperazine, 1,2-dimethylimidazole, 1-azabicylo[3.3.0]octane and preferably 1,4-diazabicylo[2.2.2]octane, and alkanolamine compounds, such as triethanolamine, triisopropanolamine, N-methyl- and N-ethyldiethanolamine and dimethylethanolamine.

Any suitable urethane forming catalyst may be used including tertiary amines such as, for example, triethylenediamine, N-methylmorpholine, N-ethylmorpholine, diethylethanolamine, N-cocomorpholine, 1-methyl-4-dimethylaminoethylpiperazine, 3-methoxypropyldimethylamine, N,N,N'-trimethylisopropyl propylenediamine, 3-diethylaminopropyldiethylamine, dimethylbenzylamine, and the like. Other suitable catalysts are, for example, stannous chloride, dibutyltin di-2-ethyl hexanoate, stannous oxide, as well as other organometallic compounds such as are disclosed in U.S. Pat. No. 2,846,408.

The foams made according to the invention are rigid or semi-rigid and, if used for insulation purposes, are closed celled. By a polyurethane foam is meant a foam having some polyurethane linkages, such as a polyurethane (PU) foam where polyurethane linkages predominate, a polyurethane-polyisocyanurate (PU-PIR) foam where there exists a significant number of polyurethane and polyisocyanurate linkages, and polyisocyanurate (PIR) foams where the polyisocyanurate linkages predominate over the polyurethane linkages; but nevertheless, polyurethane linkages are present. To prepare the polyurethane foams containing a predominant number of isocyanurate linkages, a polyisocyanurate catalyst is employed. Suitable polyisocyanurate catalysts are alkali salts, for example, sodium salts, preferably potassium salts and ammonium salts, of organic carboxylic acids, expediently having from 1 to 8 carbon atoms, preferably 1 or 2 carbon atoms, for example, the salts of formic acid, acetic acid, propionic acid, or octanoic acid, and tris(dialkylaminoethyl)-, tris(dimethylamninopropyl)-, tris-(dimethylaminobutyl)- and the corresponding tris(diethylaminoalkyl)-s-hexahydrotriazines. However, (trimethyl-2-hydroxypropyl)ammonium formate, (trimethyl-2-hydroxypropyl)ammonium octanoate, potassium acetate, potassium formate and tris(diemthylaminopropyl)-s-hexahydrotriazine are polyisocyanurate catalysts which are generally used. The suitable polyisocyanurate catalyst is usually used in an amount of from 1 to 10 parts by weight, preferably form 1.5 to 8 parts by weight, based on 100 parts by weight of the total amount of a) compounds.

Other suitable catalysts may optionally be employed in addition to the tertiary amine catalysts mentioned above. For example, tin catalysts may be used to shorten tack time and promote green strength. Suitable organotin tin catalysts are tin (II) salts of organic carboxylic acids, e.g., tin (II) acetate, tin (II) octanoate, tin (II) ethylhexanoate and tin (II) laurate, and dialkyltin (IV) salts of organic carboxylic acids, e.g., dibutyltin diacetate, dibutyltin diacetate, dibutyltin dilaurate, dibutyltin maleate, and dioctyltin diacetate. Preferred, however, are tin catalysts with tin-sulfur bonds which are resistant to hydrolysis, such as dialkyltin dimercaptides, including dimethyl-, dibutyl-, and dioctyl-tin dimercaptides.

Examples of suitable additive flameproofing agents are tricresyl phosphate, tris(2-chloroethyl) phosphate, tris(2-chloropropyl) phosphate, and tris(2,3-dibromopropyl) phosphate.

In addition to the above-mentioned halogen-substituted phosphates, it is also possible to use inorganic or organic flameproofing agents, such as red phosphorus, aluminum oxide hydrate, antimony trioxide, arsenic oxide, ammonium polyphosphate (Exolit®) and calcium sulfate, expandable graphite or cyanuric acid derivatives, e.g., melamine, or mixtures of two or more flameproofing agents, e.g., ammonium polyphosphates and melamine, and, if desired, corn starch, or ammonium polyphosphate, melamine, and expandable graphite and/or, if desired, aromatic polyesters, in order to flameproof the polyisocyanate polyaddition products. In general, from 2 to 50 parts by weight, preferably from 5 to 25 parts by weight, of said flameproofing agents may be used per 100 parts by weight of the a) compounds.

For the purposes of the invention, fillers are conventional organic and inorganic fillers and reinforcing agents. Specific examples are inorganic fillers, such as silicate minerals, for example, phyllosilicates such as antigorite, serpentine, hornblendes, amphiboles, chrysotile, and talc; metal oxides, such as kaolin, aluminum oxides, titanium oxides and iron oxides; metal salts, such as chalk, baryte and inorganic pigments, such as cadmium sulfide, zinc sulfide and glass, inter alia; kaolin (china clay), aluminum silicate and coprecipitates of barium sulfate and aluminum silicate, and natural and synthetic fibrous minerals, such as wollastonite, metal, and glass fibers of various lengths. Examples of suitable organic fillers are carbon black, melamine, colophony, cyclopentadienyl resins, cellulose fibers, polyamide fibers, polyacrylonitrile fibers, polyurethane fibers, and polyester fibers based on aromatic and/or aliphatic dicarboxylic acid esters, and in particular, carbon fibers.

The inorganic and organic fillers may be used individually or as mixtures and may be introduced into the polyol composition or isocyanate side in amounts of from 0.5 to 40 percent by weight, based on the weight of all the foaming components (the polyols and the isocyanate); but the content of mats, nonwovens and wovens made from natural and synthetic fibers may reach values of up to 80 percent by weight.

The polyol component may be reacted with the organic isocyanate at isocyanate equivalence indices ranging from 95 to 500. The flame retardance of a PU-PIR or a PIR foam is increased as the isocyanate index increases.

The organic isocyanates include all essentially known aliphatic, cycloaliphatic, araliphatic and preferably aromatic multivalent isocyanates. Specific examples include: alkylene diisocyanates with 4 to 12 carbons in the alkylene radical such as 1,12-dodecane diisocyanate, 2-ethyl-1,4-tetramethylene diisocyanate, 2-methyl-1,5-pentamethylene diisocyanate, 1,4-tetramethylene diisocyanate and preferably 1,6-hexamethylene diisocyanate; cycloaliphatic diisocyanates such as 1,3- and 1,4-cyclohexane diisocyanate as well as any mixtures of these isomers, 1-isocyanato-3,3,5- trimethyl-5-isocyanatomethylcyclohexane (isophorone diisocyanate), 2,4- and 2,6-hexahydrotoluene diisocyanate as well as the corresponding isomeric mixtures, 4,4'- 2,2'-, and 2,4'-dicyclohexylmethane diisocyanate as well as the corresponding isomeric mixtures and preferably aromatic diisocyanates and polyisocyanates such as 2,4- and 2,6-toluene diisocyanate and the corresponding isomeric mixtures 4,4'-, 2,4'-, and 2,2'-diphenylmethane diisocyanate and the corresponding isomeric mixtures, mixtures of 4,4'- and 2,4'-diphenylmethane diisocyanates and polyphenylenepolymethylene polyisocyanates (polymeric MDI), as well as mixtures of polymeric MDI and toluene diisocyanates. The organic di- and polyisocyanates can be used individually or in the form of mixtures.

Frequently, so-called modified multivalent isocyanates, i.e., products obtained by the partial chemical reaction of organic diisocyanates and/or polyisocyanates are used. Examples include diisocyanates and/or polyisocyanates containing ester groups, urea groups, biuret groups, allophanate groups, carbodiimide groups, isocyanurate groups, and/or urethane groups. Specific examples include organic, preferably aromatic, polyisocyanates containing urethane groups and having an NCO content of 33.6 to 15 weight percent, preferably 31 to 21 weight percent, based on the total weight, e.g., with low molecular weight diols, triols, dialkylene glycols, trialkylene glycols, or polyoxyalkylene glycols with a molecular weight of up to 1500; modified 4,4'-diphenylmethane diisocyanate or 2,4- and 2,6-toluene diisocyanate, where examples of di- and polyoxyalkylene glycols that may be used individually or as mixtures include diethylene glycol, dipropylene glycol, polyoxyethylene glycol, polyoxypropylene glycol, polyoxyethylene glycol, polyoxypropylene glycol, and polyoxypropylene polyoxyethylene glycols or -triols. Prepolymers containing NCO groups with an NCO content of 25 to 9 weight percent, preferably 21 to 14 weight percent, based on the total weight and produced from the polyester polyols and/or preferably polyether polyols described below; 4,4'-diphenylmethane diisocyanate, mixtures of 2,4'- and 4,4'-diphenylmethane diisocyanate, 2,4,- and/or 2,6-toluene diisocyanates or polymeric MDI are also suitable. Furthermore, liquid polyisocyanates containing carbodiimide groups having an NCO content of 33.6 to 15 weight percent, preferably 31 to 21 weight percent, based on the total weight, have also proven suitable, e.g., based on 4,4'- and 2,4'- and/or 2,2'-diphenylmethane diisocyanate and/or 2,4'- and/or 2,6-toluene diisocyanate. The modified polyisocyanates may optionally be mixed together or mixed with unmodified organic polyisocyanates such as 2,4'- and 4,4'-diphenylmethane diisocyanate, polymeric MDI, 2,4'- and/or 2,6-toluene diisocyanate.

Crude polyisocyanates may also be used in the compositions of the present invention, such as crude toluene diisocyanate obtained by the phosgenation of a mixture of toluenediamines or crude diphenylmethane isocyanate obtained by the phosgenation of crude diphenylmethane diamine. The preferred or crude isocyanates are disclosed in U.S. Pat. No. 3,215,652.

The foams can be prepared batchwise or continuously by the prepolymer process or by the one-shot process using conventional low pressure or impingement mixers. The foam ingredients may be mixed at from 15° to 90° C., preferably at 20° to 35° C., and introduced into an open mold optionally preheated, or poured or sprayed onto a substrate or into a cavity. The foams have applications where insulation is desired such as home refrigerators, industrial or equipment casings, jackets in hot water tanks or pipes, and residential and commercial building insulation. Other applications would include sound absorbing foams, energy absorbing foams, and doors.

The foams prepared herein are rigid and preferably closed cell. By a closed cell polyurethane foam is meant that at least 85% of the cells are closed. For insulation purposes, it is preferred that greater than 90%, more preferably 95% or more of the cells are closed.

The following non-limiting examples illustrate an embodiment of the invention:

| | |
|---|---|
| Polyol A | is a polyoxyalkylene polyether polyol comprising the reaction product of ethylene glycol and having an OH number of about 240. |
| Polyol B | Terate 2541, a polyester polyol, DMT-initiated. |
| Weston PTP | is a trisdipropylene glycol phosphite having what is believed to be an OH number in the range of 385 to 405, commercially available from GE Specialty Chemicals and listed as CAS No. 36788-39-3. |
| B-8432 | is a silicone surfactant commercially available from Goldschmidt Corporation. |
| HEXCHEM ® 977 | is potassium octoate, a polyisocyanurate-promoting catalyst. |
| POLYCAT ® 5 | is pentamethyldiethylenetriamine, a polyurethane-promoting catalyst commercially available from Air Products. |

EXAMPLE I

All of the polyol ingredients listed in Table I were mixed at the stated parts by weight. The amount of 200 grams of the polyol composition except 2-chloropropane was placed in each of ten four-ounce glass bottles. The stated amounts of 2-chloropropane were added to each bottle and thoroughly mixed. The bottles were left to stand for one hour, after which the results tabulated below in Table 2 were observed.

TABLE 1

| INGREDIENTS | 1 | 2 | 3 | 4 | 5 | 6 | 7 | 8 | 9 | 10 |
|---|---|---|---|---|---|---|---|---|---|---|
| POLYOL A | 100 | 100 | 100 | 100 | 100 | — | — | — | — | — |
| POLYOL B | — | — | — | — | — | 100 | 100 | 100 | 100 | 100 |
| B-8432 | 2 | 2 | 2 | 2 | 2 | 2 | 2 | 2 | 2 | 2 |

TABLE 1-continued

| INGREDIENTS | 1 | 2 | 3 | 4 | 5 | 6 | 7 | 8 | 9 | 10 |
|---|---|---|---|---|---|---|---|---|---|---|
| HEXCHEM 977 | 3 | 3 | 3 | 3 | 3 | 3 | 3 | 3 | 3 | 3 |
| POLYCAT 5 | 0.5 | 0.5 | 0.5 | 0.5 | 0.5 | 0.5 | 0.5 | 0.5 | 0.5 | 0.5 |
| WATER | 0.5 | 0.5 | 0.5 | 0.5 | 0.5 | 0.5 | 0.5 | 0.5 | 0.5 | 0.5 |
| CYCLOPENTANE[1] | 25 | 25 | 25 | 25 | 25 | 25 | 25 | 25 | 25 | 25 |
| 2-CHLOROPROPANE | 0 | 2.5 | 5 | 7.5 | 10 | 0 | 2.5 | 5 | 7.5 | 10 |

[1]The cyclopentane used was a mixture of about 70 percent cyclopentane and 30 percent of pentane isomers.

TABLE 2

| SAMPLES | RESULTS |
|---|---|
| 1 | 0.2 INCH OF CLEAR LIQUID ON TOP, REMAINDER OF LIQUID WAS CLOUDY |
| 2 | 0.1 INCH OF CLEAR LIQUID ON TOP, A MILDLY CLOUDY CENTER PORTION, AND 0.2 INCH CLEAR LIQUID ON THE BOTTOM OF JAR. |
| 3 | CLOUDY LIQUID WITH 0.5 INCH CLEAR LIQUID AT BOTTOM OF JAR. |
| 4 | CLEAR LIQUID THROUGHOUT. |
| 5 | CLEAR LIQUID THROUGHOUT. |
| 6 | ONE (1) INCH CLEAR LIQUID SEPARATED AT EIGHT (8) HOURS. |
| 7 | ONE (1) INCH CLEAR LIQUID SEPARATED AT EIGHT (8) HOURS. |
| 8 | ONE (1) INCH CLEAR LIQUID SEPARATED AT TEN (10) HOURS. |
| 9 | ONE (1) INCH CLEAR LIQUID SEPARATED AT TEN (10) HOURS. |
| 10 | ONE (1) INCH CLEAR LIQUID SEPARATED AT TWELVE (12) HOURS. |

The results indicate that at 25 pbw of the cyclopentane mixture used based on 100 pbw of the Polyol A used, 2-chloropropane immediately began solubilizing some of the cyclopentane mixture (Samples 2–3), and homogeneously solubilized the cyclopentane mixture at 7.5 and 10 pbw. However, 2-chloropropane did not solubilize the cyclopentane mixture in the polyester polyol TERATE 2541.

While the cyclopentane mixture was not miscible in TERATE 2541 in the presence of 2-chloropropane, it is to be understood that the scope of the invention only requires the presence of a polyoxyalkylene polyether polyol, which polyether polyol may be mixed with other compounds having isocyanate reactive hydrogens such as polyester polyols, even where the majority of the polyols are polyester polyols because 2-chloropropane will be effective at solubilizing some of the polyoxyalkylene polyether polyols and some modified polyester polyols.

What we claim is:

1. A homogeneously soluble polyol composition comprising:

a) one or more compounds having at least two isocyanate active hydrogens comprising a polyoxyalkylene polyether polyol;

b) 2-chloropropane; and, c) a blowing agent comprising $C_4$–$C_6$ aliphatic hydrocarbon compound.

2. The composition of claim 1, wherein the hydrocarbon c) comprises n-pentane, isopentane, cyclopentane, or a mixture thereof.

3. The composition of claim 2, wherein the amount of 2-chloropropane is from 2 pbw to 10 pbw based on 100 pbw of all polyoxyalkylene polyether polyols.

4. The composition of claim 3, wherein the amount of 2-chloropropane is from 6 pbw to 8 pbw based on 100 pbw of all polyoxyalkylene polyether polyols.

5. The composition of claim 3, wherein the amount of hydrocarbon c) is from 10 pbw to 35 pbw based on 100 pbw of all the a) compounds.

6. The composition of claim 5, wherein the amount of hydrocarbon c) is from 20 pbw to 30 pbw.

7. The composition of claim 1, wherein the a) compounds consist essentially of polyoxyalkylene polyether polyols.

8. The composition of claim 1, wherein said blowing agent comprises cyclopentane.

9. The composition of claim 8, wherein said blowing agent consists of cyclopentane and water.

10. The composition of claim 8, wherein the amount of 2-chloropropane is from 6 pbw to 8 pbw based on 100 pbw of all polyoxyalkylene polyether polyols.

* * * * *